United States Patent [19]
Petersson et al.

[11] Patent Number: 4,818,209
[45] Date of Patent: Apr. 4, 1989

[54] MOULD AND SEALING RING

[75] Inventors: Stefan Petersson, Forsheda; Bror Gustafsson, Gislaved, both of Sweden; Gunnar Parmann, Allv y, Norway

[73] Assignee: Forsheda AB, Forsheda, Sweden

[21] Appl. No.: 38,737

[22] Filed: Apr. 15, 1987

[30] Foreign Application Priority Data

Apr. 17, 1986 [SE] Sweden .................. 8601750

[51] Int. Cl.$^4$ ............................................. B29C 57/06
[52] U.S. Cl. ..................... 425/392; 285/231;
277/165; 277/207 A; 277/DIG. 2; 425/393
[58] Field of Search .................. 277/207 A, 227, 165, 277/DIG. 2; 425/392, 393, 394; 285/231

[56] References Cited

U.S. PATENT DOCUMENTS

| | | | |
|---|---|---|---|
| 2,585,453 | 2/1952 | Gallagher | 285/910 |
| 3,078,332 | 2/1963 | Marx | 285/910 |
| 3,455,566 | 7/1969 | Hull et al. | 277/188 R |
| 3,469,854 | 9/1969 | Linwood | 277/227 |
| 3,716,245 | 2/1973 | Turolla | 277/188 R |
| 3,813,107 | 5/1974 | Ditcher | 285/231 |
| 3,856,315 | 12/1974 | Stansbury | 277/207 A |
| 4,120,521 | 10/1978 | Parmann | 285/345 |
| 4,182,519 | 1/1980 | Wilson | 285/231 |
| 4,188,040 | 2/1980 | Wolf et al. | 277/207 A |
| 4,223,896 | 9/1980 | Ström | 277/207 A |
| 4,275,909 | 6/1981 | Yoshizawa et al. | 285/231 |
| 4,625,383 | 12/1983 | Vassallo et al. | 277/207 A |
| 4,637,618 | 1/1987 | Valls | 277/207 A |

Primary Examiner—Willard Hoag
Attorney, Agent, or Firm—Jeffers, Hoffman & Niewyk

[57] ABSTRACT

A mould and sealing ring constitutes a mould element in forming a socket end on a pipe consisting of thermoplastic material and seals the space in a pipe joint between the socket end and the spigot end of a pipe introduced into the socket end. The mould and sealing ring comprises an annular sealing portion consisting of elastically yieldable sealing material and a second substantially annular portion for reinforcing the mould and sealing ring consisting of a material which is rigid in relation to said elastically yieldable material and is connected with the elastically yieldable material at a connection surface. The sealing portion and the reinforcing portion constitute two portions positioned adjacent each other on each side of the connection surface in the axial direction of the ring for dividing the ring into a portion which is inactive from the sealing point of view and is active from the forming and locking point of view and a portion which is active from the sealing point of view is substantially inactive from the forming and locking point of view.

13 Claims, 3 Drawing Sheets

MOULD AND SEALING RING

The present invention relates to a mould and sealing ring for constituting a mould element in forming a socket end of a thermoplastic material pipe and for sealing the space of a pipe joint between the socket end and the spigot end of a pipe introduced into the socket end.

When using a mould and sealing ring of the above kind as a mould element the ring is positioned on the outer surface of a substantially cylindrical forming mandrel, whereupon an end portion of the thermoplastic material pipe in a heated, softened state is pushed over the mandrel and the mould and sealing ring located thereon. Thereby, the pipe end portion is formed to a socket, in which the mould and sealing ring forms in the socket a groove in which the ring is retained. After cooling the thermoplastic pipe the pipe and the mould and sealing ring are withdrawn from the mandrel with the mould and sealing ring remaining in the groove formed in the socket end. When jointing the pipe with an other pipe the mould and sealing ring is used for sealing the space between the socket end and the spigot end of a pipe introduced into the socket end.

The function as a mould or forming element and the function as a sealing element call for contradictory features of the mould and sealing ring. To be able to comply with its purpose as a moulding or forming element the ring shall be able to resist the forces exerted on the ring during the forming operation making it desirable to have a rather rigid ring. On the other hand the mould and sealing ring shall have elastomeric features to be able to comply with its sealing object. In order to comply with these contradictory requirements a prior art mould and sealing ring comprises a first annular sealing portion consisting of elastically yieldable sealing material and a second substantially annular portion for reinforcing the mould and sealing ring consisting of a material which is rigid in relation to the elastically yieldable material and firmly connected with the elastically yieldable material at a connection surface. In a previously known mould and sealing ring of this kind the reinforcing portion consisting of relatively rigid material is constituted by a steel ring which is enclosed in the elastically yieldable material of the annular sealing portion. In a mould and sealing ring of this kind the elastically yieldable material is utilized not only for providing the sealing function of the mould and sealing ring but also as the mould and forming portion of the ring by the fact that the major portion of the external surfaces of the ring, i.e. the surfaces engaging the forming mandrel as well as the surfaces engaged by the softened thermoplastic material during the forming operation, are constituted by the elastically yieldable sealing material. This entails drawbacks and problems in accomplishing the forming operation. A further drawback of the mould and sealing rings of the prior art type is that the steel rings for constituting the reinforcing portions of the mould and sealing rings are relatively expensive.

The object of the present invention is to provide a mould and sealing ring of the kind described above which is improved in the respects discussed above.

In order to comply with this object the mould and sealing ring according to the invention is characterized in that the sealing portion and the reinforcing portion constitute two portions positioned adjacent to each other in the axial direction of the ring on each side of the connection surface between the portions for dividing the ring into a portion which is inactive from the sealing point of view and active from the forming and locking point of view and a portion which is active from the sealing point of view and is substantially inactive from the forming and locking point of view, the portion constituting the reinforcing member which is active from the forming and locking point of view constituting the side of the mould and sealing ring first engaged by the pipe and portion when forming the socket end and having less radial extension than the portion forming the sealing portion and being active from the sealing point of view.

In a mould and sealing ring according to the invention the forming and sealing functions are separated which is advantageous with regard to the function as well as with regard to the costs. Thus, the forming function of the ring is provided by a relatively rigid material facilitating the retaining of the ring on the forming mandrel and making it easier to provide the connection of the side of the ring initially engaged by the thermoplastic pipe when accomplishing the forming operation with the outer surface of the forming mandrel in such a way that the risk of pushing the ring in front of the pipe end portion when the pipe end portion shall be pushed over the ring is obviated. In a mould and sealing ring according to the invention the reinforcing member can consist of a relatively cheap plastic material instead of steel reducing the total costs of the ring. In a mould and sealing ring according to the invention it is possible also to manufacture only the portion of the ring which is active from the sealing point of view from an elastically yieldable material and to manufacture a substantial portion of the ring from a plastic material which is cheap in relation to the costs of the elastically yieldable material. Also this fact provides for a substantial reduction of the costs of the mould and sealing ring.

In a preferred embodiment of the invention the reinforcing portion forms at its side opposite from the connection surface between the reinforcing portion and the sealing portion a wedge-shaped edge portion providing a close engagement of the reinforcing portion with an outer surface portion of the substantially cylindrical forming mandrel. Thereby, it is suitable that the wedge-shaped edge portion has at its free edge an inner diameter which is less than the outer diameter of the outer surface portion of the forming mandrel adapted to be engaged by said edge portion and said edge portion is resilient in the radial direction so as to be elastically expandable to the position in engagement with said outer surface portion when the mould and sealing ring is positioned on the mandrel. This provides a close engagement of the free edge of the reinforcing member with the outer surface of the mandrel irrespectively of relatively great tolerances of the reinforcing member which preferably consists of plastic. Preferably, the resiliency of the edge portion is provided by forming a number of slots or depressions extending through the free edge of the edge portion.

As a consequence of the fact that the mould and sealing ring according to the invention has a portion of a relatively rigid material positioned in connection with the forming mandrel it is in a simple way possible to lock the mould and sealing ring with regard to axial displacement on the forming mandrel during the forming operation by providing the reinforcing mandrel of the mould and sealing ring and the outer surface of the forming mandrel with locking means engaging each other.

In order to provide an improved binding between the sealing and reinforcing portions of the mould and sealing ring at the connection surface thereof it is possible to design this surface so that it diverges from the shape of a flat surface. For example it is possible to design the connection surface so that it has a zigzag or V-shaped cross-section and/or so that it is corrugated in the peripheral direction.

The invention is described in the following with reference to the accompanying drawings.

Figure 1:
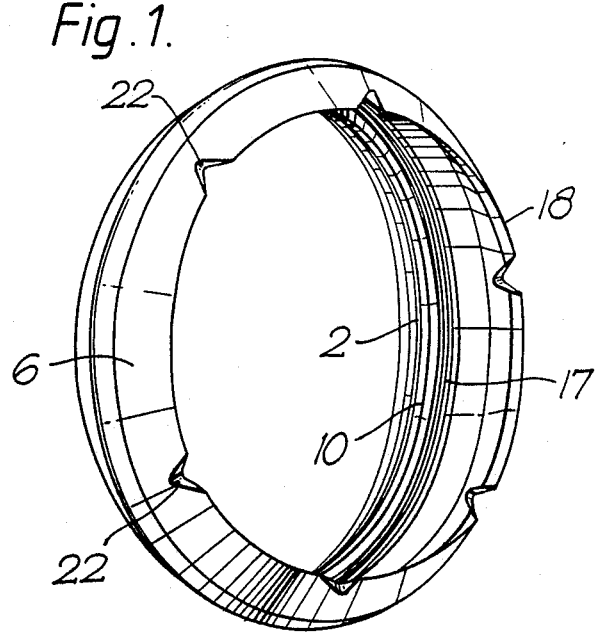
FIG. 1 is a perspective view of an embodiment of a mould and sealing ring according to the invention.
Figure 2:
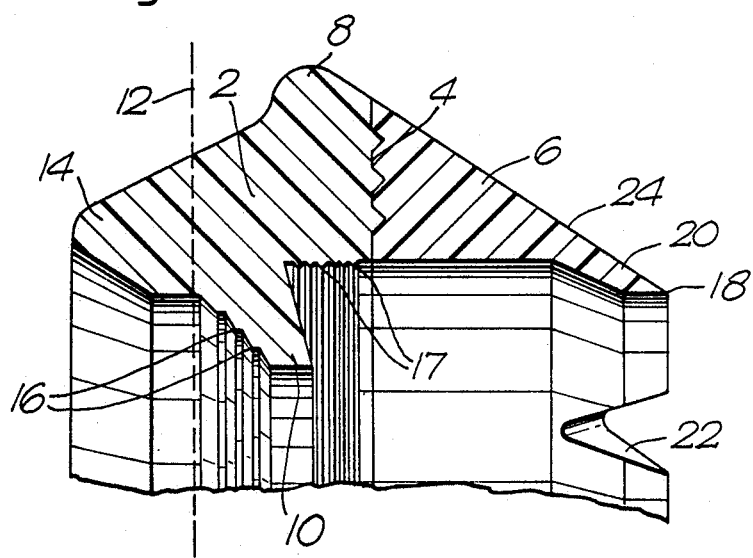
FIG. 2 is an axial section of the mould and sealing ring shown in FIG. 1.

The mould and sealing ring according to the invention shown in FIGS. 1-4 comprises a sealing portion 2 consisting of rubber and a reinforcing portion 6 consisting of relatively rigid plastic material and firmly connected with the sealing portion 2 at a connection surface 4 having zigzag-shaped cross-section. At its outer periphery the sealing portion 2 has a portion 8 projecting radially outside the connection surface 4. At its inner periphery the sealing portion 2 has a portion 10 positioned radially inside the connection surface 4. Thus, the sealing portion 2 can be considered to be defined by the projecting portions 8 and 10, the connection surface 4 and a plane coincident with the broken line 12 of FIG. 2. When utilizing the sealing function of the mould and sealing ring this sealing portion 2 is subjected to a radial compression. In addition to the sealing portion 2 and the reinforcing portion 6 the mould and sealing ring comprises a portion 14 unitary with the sealing portion 2 and positioned at the opposite side of the broken line 12 from the sealing portion 2. Even if the portion 14 can contribute to the sealing function of the mould and sealing ring for example by acting as a sealing lip it does not constitute an active sealing portion of the mould and sealing ring according to the invention in the same way as the sealing portion 2. Thus, it is for economic reasons possible to manufacture also the portion 14 from a plastic material which is less costly than the rubber material of the sealing portion 2. The sealing portion 2 is provided with ridges 16 and 17 for improving the sealing function.

The reinforcing portion 6 consisting of plastic material is substantially wedge-shaped and forms at its side opposite from the connection surface 4 a relatively sharp side edge 18. Adjacent to the side edge 18 the reinforcing portion 6 forms an edge portion 20 of successively reduced inner diameter. The edge portion 20 is resiliently expandable to a position in which the inner surface of the edge portion 20 approaches a cylindrical shape, the resiliency being provided by the fact that the edge portion 20 is interrupted by a number of recesses provided along the periphery of the side edge portion 20. Thereby, it is suitable that the sprues formed at the manufacturing of the reinforcing portion 6 consisting of plastic are located to the bottom of the recesses 22 where the sprues do not disturb the forming operation. At its outer surface 24 the reinforcing portion 6 constitutes a substantially conical surface having a knurled structure.

Figure 3:
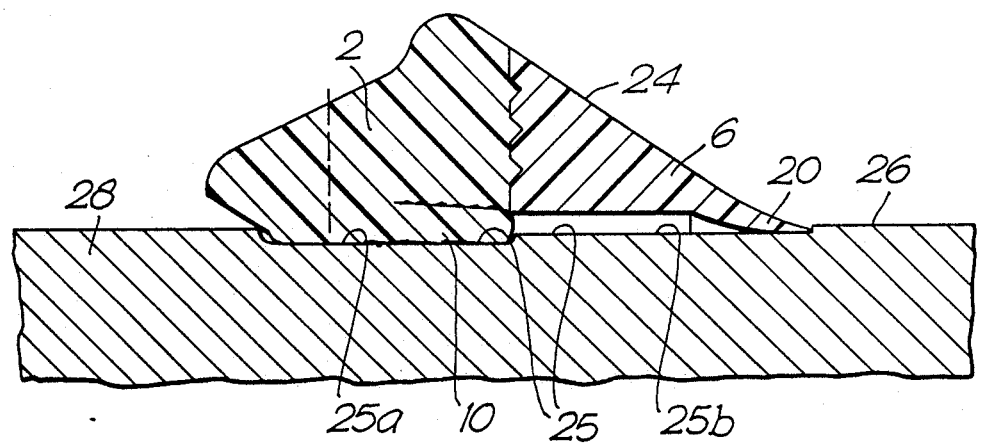
FIG. 3 is an axial section of the mould and sealing ring of FIG. 1 and 2 arranged on the surface of a forming mandrel.

In FIG. 3 the mould and sealing ring is shown in a tensioned position in a shallow groove 25 on the substantial cylindrical outer surface 26 of a forming mandrel 28. The groove 25 comprises a deeper portion 25a engaged by the portion 10 of the ring and a more shallow portion 25b engaged by the inner surface of the reinforcing portion 6. In the tensioned position on the mandrel 28 the portion 10 is compressed and the edge portion 20 of the reinforcing portion is resiliently expanded, the inner surface of the ring positioned between the portion 10 and the edge portion 20 being located at a small radial distance from the bottom of the groove 25, so that the ring is somewhat resiliently resting on the portion 10 and the edge portion 20. Because of its tendency to return to the position of FIG. 2 the edge portion 20 is at a great force pressed against the outer surface of the forming mandrel 28 so that the sharp side edge 18 closely engages the surface 26.

Figure 4:
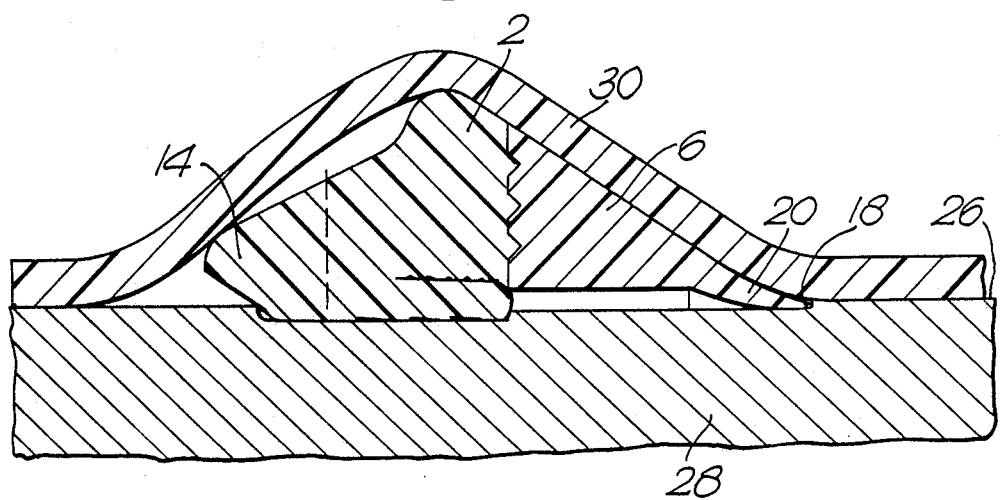
FIG. 4 is an axial section showing the forming of a pipe socket by means of a forming mandrel and the mould and sealing ring according to the invention arranged thereon.

When forming a socket at the end portion of a thermoplastic pipe the pipe end portion is pushed over the mould portions constituted by the mandrel 28 and the mould and sealing ring, as shown in FIG. 4, the reinforcing portion 6 of the mould and sealing ring forming at its outer surface 24 the substantial forming or moulding surface of the mould and sealing ring. Because of the fact that the surface 24 is in close connection with the surface 26 of the mandrel and forms a rigid abutment there is provided for a reliable displacement of the pipe end portion 30 over the mould and sealing ring without any tendency of displacement of the ring on the surface of the mandrel. The knurled structure of the surface 24 facilitates the sliding of the pipe end portion 30 along the surface in question.

The mould and sealing ring forms an inner groove in the socket end of the pipe end portion 30 and after the withdrawal of the mandrel 26 from the pipe end portion after the cooling of the softened pipe end portion the mould and sealing ring is retained in the groove in a locked-in position provided by the reinforcing portion 6. In this position the portion of the mould and sealing ring which is active from the sealing point of view substantially consists of the sealing portion 2. When providing a pipe joint the sealing portion 2 is compressed between the bottom of the groove formed in the socket and the outer surface of a spigot end of a pipe end portion introduced into the socket, said spigot forming together with the pipe end portion a pipe joint. However, the portion 14 can be designed so as to form a lip seal engaging the outer surface of said spigot end. From the sealing point of view the reinforcing portion 6 is completely inactive. However, the reinforcing portion 6 can contribute to the stability of the joint by striving to take the inwards directed position shown if FIG. 2 and thereby engaging the outer surface of the spigot end at the edge 18.

Figure 5:
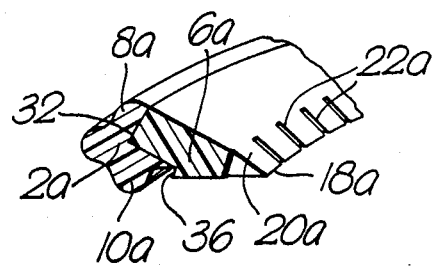
FIG. 5 is a perspective view of a section of modified embodiment of a mould and sealing ring according to the invention.

In FIG. 5 there is shown a mould and sealing ring according to the invention which is slightly modified with regard to the design of the connection surface between the sealing portion 2a and the reinforcing portion 6a and with regard to the design of the recesses at the side edge portion 20a of the reinforcing portion 6a. Thus, in the embodiment according to FIG. 5a the sealing portion 2a and the reinforcing portion 6a are connected with each other at a connection surface 32a which is of substantially V-shaped cross-section provided that the reinforcing portion 6a extends into the sealing portion 2a between the portions 8a and 10a thereof. This provides a stiffening of the sealing portion 2a between the portions 8a and 10a thereof. In the embodiment of FIG. 5 the recesses in the side edge portion 20a of the reinforcing portion 6a are formed as slots 22a positioned at a small distance from each other.

Figure 6:
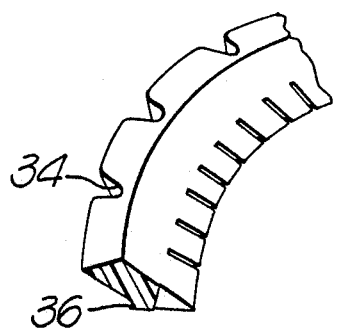
FIG. 6 is a perspective view of a reinforcing portion of a mould and sealing ring according to FIG. 5.

In order further to improve the binding between the sealing portion and the reinforcing portion the connection surface can be provided with recesses 34a as shown in FIG. 6.

Figure 7:
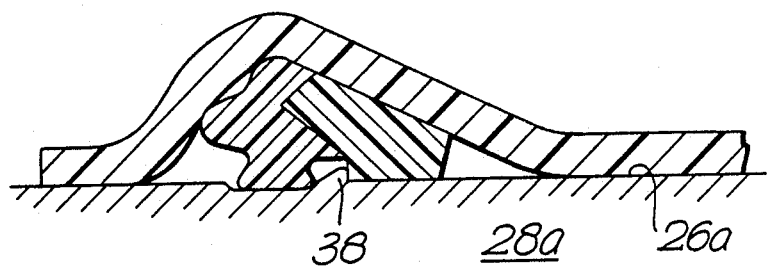
FIG. 7 is an axial section of the mould and sealing ring of FIG. 5 arranged on a forming mandrel.

The mould and sealing ring shown in FIG. 5 differs from the sealing ring according to FIGS. 1–4 also in the respect that the reinforcing portion 6a is provided with a shoulder 36, as shown in FIG. 7 utilized for anchoring the mould and sealing ring to the outer surface 26a of the mandrel 28a in a more reliable way. In accordance therewith the shoulder 36 engages a projection 38 of the surface 26a.

Figure 8:
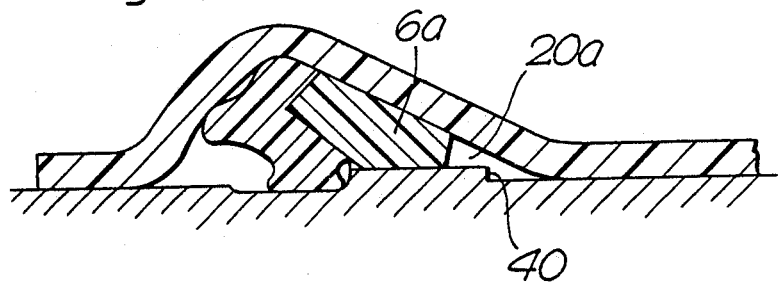
FIG. 8 is an axial section of a further modified embodiment of a mould and sealing ring according to the invention arranged on a forming mandrel.

In FIG. 8 there is shown an embodiment of the mould and sealing ring according to the inventor, in which the reinforcing portion 6a is provided with a shoulder 40 corresponding to the shoulder 36 in the embodiment of FIG. 7. The shoulder 40 is positioned within the region of the resilient side edge portion 20a of the reinforcing portion 6a.

The invention can be modified within the scope of the following claims.

We claim:

1. In combination:
   a cylindrical mandrel having an annular projection and a pair of annular grooves therein, wherein said annular projection separates said grooves and abuts an annular shoulder of said reinforcing portion; and
   a mold and sealing ring mounted on said mandrel, said ring including a first annular sealing portion of elastically yieldable sealing material having an inner peripheral projecting portion received in one of said grooves in radially compressed relation and a second annular reinforcing portion of a rigid material positioned axially adjacent and in abutting relation with said sealing portion, said reinforcing portion having a wedge shape for guiding a heated plastic pipe end thereover and having a resiliently expandable edge portion with a sharp edge received in the other of said grooves in radially expanded relation.

2. A mold and sealing ring adapted for forming a pipe end and sealing the pipe end to a spigot end of another pipe in a pipe joint, said sealing ring comprising:
   a first annular sealing portion of elastically yieldable sealing material; and
   a second annular reinforcing portion of a rigid material relative to said sealing material, said portions being positioned axially adjacent each other and in abutting relation to each other with said reinforcing portion having a section of less radial extension than said sealing portion, said reinforcing portion having a radially resilient wedge-shaped edge portion for expansion over a mandrel of greater outside diameter, wherein said edge portion includes a plurality of circumferentially disposed recesses to impart resiliency thereto.

3. A mold and sealing ring as set forth in claim 2 wherein each recess is of V-shape with a decreasing width in a direction away from an edge of said edge portion.

4. A mold and sealing ring as set forth in claim 2 wherein said reinforcing portion has a locking means for mounting on a mandrel.

5. A mold and sealing ring as set forth in claim 4 wherein said means is a radially inwardly directed shoulder.

6. A mold and sealing ring as set forth in claim 2 wherein said portions abut along non-planar surfaces.

7. A mold and sealing ring comprising:
   a first annular sealing portion of elastically yieldable sealing material, said sealing portion having an outer peripheral portion radially outside said reinforcing portion and an inner peripheral portion radially inside said reinforcing portion; and
   a second annular reinforcing portion of a rigid material relative to said sealing material, said portions being positioned axially adjacent each other and in abutting relation to each other with said reinforcing portion having a section of less radial extension than said sealing portion.

8. A mold and sealing ring adapted for forming a pipe end and sealing the pipe end to a spigot end of another pipe in a pipe joint, said sealing ring comprising:
   a first annular sealing portion of elastically yieldable sealing material; and
   a second annular reinforcing portion of a rigid material relative to said sealing material, said portions being positioned axially adjacent each other and in abutting relation to each other with said reinforcing portion having a section of less radial extension than said sealing portion, wherein said portions abut along non-planar surfaces and each of said portions has a V-shaped surface matingly received in the other portion.

9. A mold and sealing ring adapted for forming a thermoplastic pipe end and sealing the thermoplastic pipe end to a spigot end of another pipe in a pipe joint, said sealing ring comprising:
   a first annular sealing portion of elastically yieldable sealing material having an outer peripheral projecting portion and an inner peripheral projecting portion coplanar with said outer projecting portion; and
   a second annular reinforcing portion of a rigid material positioned axially adjacent and in abutting relation with said sealing portion, said reinforcing portion having a wedge-shape for guiding of a heated plastic pipe end thereover, and being of less radial extent than said outer projecting portion of said sealing portion and of greater radial extent than said inner projecting portion of said sealing portion, and wherein said reinforcing portion has a resiliently expandable edge portion which includes a plurality of circumferentially disposed recesses to impart resiliency thereto.

10. A mold and sealing ring as set forth in claim 9 wherein each recess is of V-shape with a decreasing width in a direction away from an edge of said edge portion.

11. A mold and sealing ring as set forth in claim 9 wherein said portions abut along non-planar surfaces.

12. A mold and sealing ring adapted for forming a thermoplastic pipe end and sealing the thermoplastic pipe end to a spigot end of another pipe in a pipe joint, said sealing ring comprising:
  a first annular sealing portion of elastically yieldable sealing material having an outer peripheral projecting portion and an inner peripheral projecting portion coplanar with said outer projecting portion; and
  a second annular reinforcing portion of a rigid material positioned axially adjacent and in abutting relation with said sealing portion, said reinforcing portion having a wedge-shape for guiding of a heated plastic pipe end thereover, and being of less radial extent than said outer projecting portion of said sealing portion and of greater radial extent than said inner projecting portion of said sealing portion, wherein said reinforcing portion has a V-shaped portion extending into said sealing portion between said projecting portions to stiffen said sealing portion.

13. A mold and sealing ring as set forth in claim 12 wherein said V-shaped portion includes a plurality of circumferentially spaced recesses receiving said sealing portion.

* * * * *